United States Patent Office 2,821,525
Patented Jan. 28, 1958

2,821,525

AZO COLORING MATTERS

George Raymond Waitkins, Kirkwood, Mo., and Harold Talbot Lacey, Westfield, N. J., assignors to American Cyanamid Company, New York, N. Y., a corporation of Maine No Drawing. Application April 7, 1953
Serial No. 347,384

7 Claims. (Cl. 260—151)

The present invention refers to new pigments and, more especially, to new pigments of the formula:

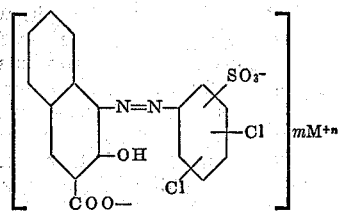

in which M is a metal cation of $n$ positive charges and $m$ is the number of such cations, chosen so that $m$ times $n$ equals two, $n$ being a whole number greater than one. These pigments have valuable shades which range from red to maroon.

One of the most important uses for high quality lacquers and enamels in the modern economy is for automotive finishes. Such lacquers and enamels must be made to withstand severe weathering. The pigments which go into them must possess certain critical qualities to a high degree. They must retain the color as much as possible under the severe weathering to which automobiles are subjected. This requires, above all, a good fastness to light. It also requires resistance to chalking and to bronzing and retention of gloss and color value. The lacquer or enamel manufacturer requires that the pigments have good working properties in order that the pigment may be incorporated into the vehicle properly to produce a good coating.

Maroon is a popular color for automobiles, but it is not as popular as it could be. The well-informed automobile purchaser will avoid such a color because the cheaply-available maroon pigments, heretofore used, were not entirely satisfactory in some of these respects. Especially, they have tended to fade or otherwise change color in light and weather. They also have a tendency to bleed in solvents, such as are used for lacquers and enamels, and a tendency to chalk and bronze badly. This need for such cheap, easily manufactured maroon pigments of good properties has never been satisfactorily filled.

We have found that the metallic salts of azo pigments obtained by coupling a dichloroaniline sulfonic acid on 2-hydroxy-3-naphthoic acid are beautiful maroon and red coloring matters that combine in high degree the qualities of excellent working properties with resistance to bleeding in solvents and to the destructive action of light and weather in both lacquer and enamel finishes, such as resistance to chalking, to bronze development, and to fading, together with retention of gloss and color values.

In one of the preferred embodiments of our invention, o-dichlorobenzene is nitrated to give a mixture of isomers, which can be reduced and sulfonated to a mixture of dichloroaniline sulfonic acids as follows:

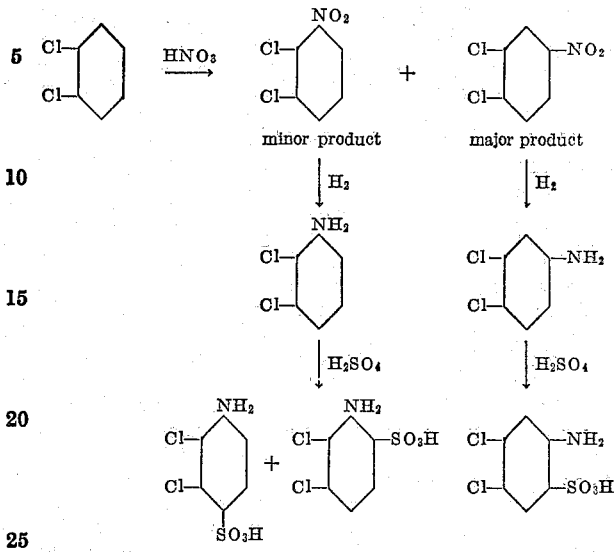

The dichloroaniline sulfonic acids thus obtained are diazotized, coupled with 2-hydroxy-3-naphthoic acid, and the products converted to metallic salts by methods known to the art to give a wide variety of valuable maroon and red pigments.

Pure intermediates are generally found preferable in synthetic operations. In the manufacture of dyestuffs, mixtures of products often give muddy shades and inferior fastness. It is almost a truism of the synthetic color industry that pure compounds are needed to get bright shades. It was, therefore, most suprising and unexpected to find that the mixture of dichloroaniline sulfonic acids obtained in the above way does not have to be separated but can be directly diazotized and coupled with 2-hydroxy-3-napthtoic acid to give valuable products of brilliance and luster. It has also been found that the starting o-dichlorobenzene need not be chemically pure but may actually contain minor amounts of other isomeric dichlorobenzenes without interfering with this process or impairing the value of the product. In fact, some desirable properties, such as dark masstone, high transparency, and increased strength, are produced by such minor contaminants, and in certain cases they may be added deliberately to produce special effects. Thus the use of mixtures obtained by processing technical quality dichlorobenzenes constitutes a preferred embodiment of the present invention, which, however, is not limited thereto.

If desired, the preponderant isomer, of the formula:

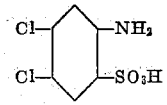

may be isolated in substantially pure form and used as such or in admixture with other diazotizable intermediates. This separation can be effected, for example, by fractionating the nitration product of o-dichlorobenzene to give substantially pure 3,4-dichloronitrobenzene, which is then subjected to the above procedures of reduction and sulfonation to give an essentially pure product. Alternatively, if desired, the isomer separation can be carried out after sulfonation. The 2-amino-4,5-dichlorobenzene sulfonic acid is less soluble than the isomeric sulfonic acids prepared by this procedure and is readily separated from alkali solution by acidification with mineral acids. The other isomers remain in solution. For example, an essentially pure 2-amino-4,5-dichlorobenzene sulfonic acid has been obtained economically by either of the above purification processes, starting with commercial o-dichlorobenzene which contained as high as 25% isomeric dichlorobenzenes.

The pigments, prepared by coupling 2-amino-4,5-dichlorobenzene sulfonic acid with beta-oxynaphthoic acid followed by formation of a metal salt share the advantageous properties of the isomeric mixture, possessing somewhat lighter masstone, greater lightfastness and opacity. When these properties are particularly desirable, it may be found preferable to employ the chemically pure product instead of the mixture of isomeric sulfonic acids.

The pigments of this invention, especially those obtained by diazotizing and coupling the pure or the substantially pure 2-amino-4,5-dichlorobenzene sulfonic acid with beta-oxynaphthoic acid followed by salt formation with an appropriate metal, are superior in lightfastness to the corresponding pigments of commerce prepared in like manner from the alkyl-chloro-aniline-sulfonic acids, such as 2-amino-4-methyl-5-chlorobenzene sulfonic acid and 2-amino-4-chloro-5-methylbenzene sulfonic acid. In the present state of the art, it is not possible to explain this phenomenon, and the present invention is not limited to any specific theories.

Pigments of valuable properties are obtained in similar manner from the other isomeric amino dichlorobenzene sulfonic acids made from the sulfonation of the known dichloroanilines, such as 4-amino-3,5-dichlorobenzene sulfonic acid, 2-amino-3,4-dichloro sulfonic acid, 4-amino-2,3-dichlorobenzene sulfonic acid, 2-amino-3,5-dichlorobenzene sulfonic acid, 2-amino-4,6-dichlorobenzene sulfonic acid and 4-amino-3,6-dichlorobenzene sulfonic acid.

Any metallic cation may be used for salt formation, although some are more valuable than others. The choice of metal exerts an appreciable influence on the shade and other properties of the product, and it will depend on the application in view. For example, chromium and zinc give products which are yellower in shade, while bluer shades are given by cobalt, tin, zirconium, and titanium. It is to be understood, of course, that these represent only secondary shade differences in the basic maroon or red color which is common to all the pigments of this class. Metals which have been found particularly desirable are those forming divalent cations, especially the metals of atomic number from 22 to 30, such as chromium, manganese, iron, cobalt, nickel, and zinc and the alkaline earth metals, such as calcium strontium, and barium.

While these products are very valuable maroon or red pigments used as such, they are not limited to this use but also serve as excellent blending agents for other colors. The dichloroaniline sulfonic acids are of particular value when blended in small proportions with other aromatic amino sulfonic acids and aromatic amines, such as aminonaphthalene sulfonic acids, chlorotoluidine sulfonic acids, aniline sulfonic acids, toluidines, and naphthylamines, and co-coupled with beta-oxynaphthoic acid as the coupling component. They can be used very effectively in minor amounts to shade to the yellow side products obtained by coupling chlorotoluidine sulfonic acids on beta-hydroxynaphthoic acid, giving blends of high lightfastness.

The present invention is described in further detail in the following examples. Parts are by weight unless otherwise specified.

*Example 1*

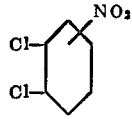

To 325 parts of o-dichlorobenzene, at a temperature of approximately 60° C., is added gradually, with vigorous stirring, 1300 parts of mixed acid consisting essentially of 56–57% sulfuric acid, 27% nitric acid, and 16% water. After the addition, the nitration is completed by stirring for a short time at 60–65° C., and the mixture is drowned in 1250 parts of ice and 750 parts of water. The product is separated and washed free of acid. The yield of the isomeric mixture is excellent.

If desired, this product can be fractionated to give a good yield of 3,4-dichloronitrobenzene. This pure product can then be subjected to the reduction, sulfonation, diazotization, coupling, and laking procedures described below to give the essentially pure products corresponding to the structure of the starting material.

*Example 2*

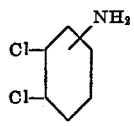

A mixture of 2000 parts of water, 26 parts of glacial acetic acid, and 420 parts of powdered iron is heated to reflux, and there is gradually added to it, with stirring, 410 parts of the crude product obtained in the nitration of Example 1. Refluxing is then continued until the reduction is substantially complete. After cooling to 90° C., 35 to 40 parts of anhydrous sodium carbonate is added to the mixture, followed by 2000 parts of o-dichlorobenzene. The iron sludge is then filtered off and washed with water and an additional 200 parts of o-dichlorobenzene, the product then isolated in the form of its solution in dichlorobenzene. The dichlorobenzene layer is separated. The product dissolved therein can be determined by nitrate titration of an aliquot.

*Example 3*

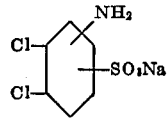

The o-dichlorobenzene solution of dichloroanilines obtained in Example 2 is heated to 160° C. One hundred ninety-five parts of 99.2% sulfuric acid is gradually added with rapid stirring. Any water present in the mixture is removed by distillation during the sulfonation. The distillate is replaced by an equal volume of dry dichlorobenzene. Upon completion of the reaction, the mixture is cooled and freed of solvent by steam distillation. The residual mixture is made alkaline with sodium hydroxide, clarified by filtration, and then acidified with concentrated hydrochloric acid; salt is added and the product is isolated by filtration, washed, and dried.

If the sodium chloride is replaced by excess concentrated hydrochloric acid, essentially pure 2-amino-4,5-dichlorobenzene sulfonic acid is obtained. The isomers remain in solution from which, if desired, they can be salted out after filtration of the above isomer.

*Example 4*

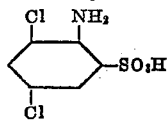

A solution of 100 parts of 2,4-dichloroaniline in 800 parts of dichlorobenzene is stirred at 175–178° C. while 62 parts of 96% sulfuric acid is added gradually. The by-product water of reaction is distilled as formed until the reaction is complete. The reaction mixture is mixed with 1700 parts of water made alkaline with sodium carbonate, followed by steam distillation to remove the dichlorobenzene. The hot solution is treated with charcoal to decolorize it. The sodium salt of the product is salted out and filtered. By using excess mineral acid to acidify a solution of the sodium salt, the free 2-amino-3,5-dichlorobenzene sulfonic acid can be isolated.

Example 5

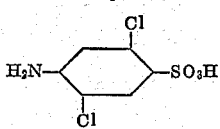

A solution of 162 parts of 2,5-dichloroaniline in 1000 parts of dichlorobenzene is stirred at 170–175° C. while 100 parts of 96% sulfuric acid is added gradually. Water of reaction is then distilled until the reaction is substantially complete. The sodium salt of 4-amino-2,5-dichlorobenzene sulfonic acid is isolated as in Example 4 and may be converted to the free acid in the same manner.

Example 6

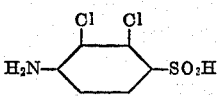

A solution of 54 parts of 2,3-dichloroaniline in 400 parts of dichlorobenzene is stirred at 170–175° C. while 34 parts of 96% sulfuric acid is added gradually. Water of reaction is distilled until the reaction is complete. The sodium salt is isolated in the same manner as described in Example 4 and can be similarly converted to the free 4-amino-2,3-dichlorobenzene sulfonic acid.

Example 7

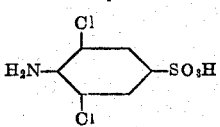

Thirty-three parts of chlorsulfonic acid is added gradually to a solution of 43 parts of 2,5-dichloraniline in 250 parts of dischlorobenzene. After dilution with 40 parts of dichlorobenzene, the mixture is stirred at 140–160° C. until the reaction is substantially complete. The cooled reaction mixture is filtered and the product is purified as described for its isomer in Example 6.

Example 8

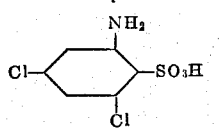

2-amino-4,6-dichlorobenzene sulfonic acid is obtained by gradual addition of 116.5 parts of chlorsulfonic acid to a solution of 162 parts of 3,5-dichloroaniline in 1600 parts of dichlorobenzene, and followed by heating the mixture at 140–160° C. until the reaction is complete. This product is recovered by filtering the cooled reaction mixture. If desired, the product can be purified further by dissolving in dilute alkali and re-precipitating with hydrochloric acid. The sodium salt can be precipitated from the aqueous alkaline solution by the addition of sufficient salt.

Example 9

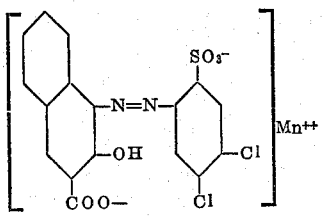

A solution of 65.6 parts of the mixed amino dichlorobenzene sulfonic acids prepared as in Example 3 in 800 parts of water and 100 parts of 5 N sulfuric acid is cooled to 0° C., acidified with hydrochloric acid, and diazotized in the ordinary way with sodium nitrite. To the resulting diazo slurry is added a solution of 96 parts of manganese chloride tetrahydrate crystals in 200 parts of ice and water. The resulting slurry is added to a coupling solution consisting of 54 parts of 2-hydroxy-3-naphthoic acid and 80 parts of sodium acetate in 3400 parts of water containing 170 parts of 5 N sodium hydroxide. Coupling is completed in the usual way. The slurry is heated gradually to 100° C. It may be rosinated by adding abietic acid as a dilute sodium hydroxide solution. The product is then filtered, washed and dried. The yield is excellent.

In lacquer and enamel formulations, when evaluated by the standard procedures of the art, this product proves outstanding in lightfastness, color retention, and resistance to bronze, chalking, and bleeding.

If, instead of the mixed amino dichlorobenzene sulfonic acids, the essentially pure 2-amino-4,5-dichlorobenzene sulfonic acid is used in this example, the resulting manganese salt is lighter in masstone and superior in lightfastness.

If the coupling products are prepared with calcium chloride instead of manganese chloride, the calcium salt is obtained and is readily isolated by similar procedures.

Example 10

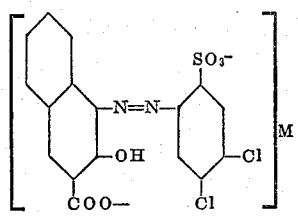

The diazo prepared in the customary way from 5.45 parts of essentially pure 2-amino-4,5-dichlorobenzene sulfonic acid is coupled with an alkaline solution of 4.5 parts of 2-hydroxy-3-naphthoic acid, containing a slight excess of basic chromic acetate solution. Coupling is completed in the ordinary way, the temperature gradually being raised to 100° C. The bright red product is filtered, washed, and dried. If the mixed dichloroaniline sulfonic acids are used in this procedure, the product shows a brick red color. By using 10 parts of zinc chloride instead of basic chromic acetate, the clear red zinc salt is obtained. It is especially superior in lightfastness to products known to the art.

Other salts which can be prepared in a similar manner (substituting equivalent amounts of their salts for the zinc chloride) are copper, nickel, aluminum, cobalt, tin, zirconium, titanium, iron, and lead.

Example 11

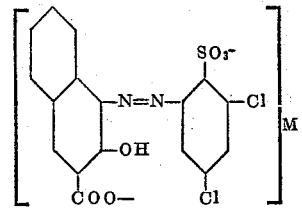

Essentially pure 2-amino-4,6-dichlorobenzene sulfonic acid obtained as described in Example 8, is diazotized and coupled with beta-oxynaphthoic acid in the presence of metal salts as described in Examples 9 and 10. The resulting pigments are characterized by darkness and depth of masstone, exceptionally high transparency, resistance to bleed in organic solvents, exceptionally good lightfastness, and a somewhat yellower maroon shade than those obtained from corresponding pigments from the 2-amino-4,5-dichlorobenzene sulfonic acid.

Example 12

Five and forty-five hundredths parts of 2-amino-3,5-dichlorobenzene sulfonic acid (Example 4) is dissolved in a solution of 125 parts water and 10 parts of 10% sodium hydroxide. The solution is cooled to 0° C. with ice, and 16.5 parts by volume of 20% hydrochloric acid is added. Twenty-two and five-tenths parts of tenth normal sodium nitrite solution is added, and the mixture is stirred for 10 minutes at 0-2° C. Four and five-tenths parts of 2-hydroxy-3-naphthoic acid is dissolved in a solution consisting of 435 parts water, 1.5 parts sodium carbonate, 1.6 parts of sodium acetate, and 1.7 parts sodium hydroxide. To this is added a separate solution prepared by dissolving 1.5 parts of wood rosin, 1 part of mixed naphthenic acids, and 0.3 part of sodium hydroxide in 60 parts of water. Three parts of calcium chloride is then added with stirring, and the mixture is cooled to 15° C. The diazo slurry is added gradually with stirring at 10-11° C. A bright, orange-red precipitate is formed. One and five-tenths parts of $Na_2CO_3$ in 13.5 parts of water is added, and stirring is continued as the temperature rises to 20° C. The slurry is heated gradually to 100° C. and is held at 98-101° C. until the reaction is complete. The slurry is cooled to 85° C. with cold water and the pigment is recovered by filtering, washing, and drying. The product is obtained as an easy-grinding, orange-red powder showing excellent color value and lightfastness when rubbed out in inks.

*Example 13*

The colors of the metal salts of some of the various dichloroaniline sulfonic acids coupled into 2-hydroxy-3-naphthoic acid are as follows:

| Dichloroaniline Sulfonic Acid | Metal | Color |
| --- | --- | --- |
| 2-amino-3,5-dichlorobenzene sulfonic acid | Calcium | Orange Red. |
| 4-amino-2,5-dichlorobenzene sulfonic acid | do | Do. |
| 4-amino-2,3-dichlorobenzene sulfonic acid | do | Bright Yellow Red. |
| 2-amino-4,5-dichlorobenzene sulfonic acid | Manganese | Maroon. |
| Do | Calcium | Orange Red. |
| Do | Chromium | Brick Red. |
| Do | Zinc | Clear Red. |
| 2-amino-4,6-dichlorobenzene sulfonic acid | Manganese | Maroon. |

*Example 14*

Mixtures of the composition 95% essentially pure 2-amino-4,5-dichlorobenzene sulfonic acid and about 5% of one of the following amines:

2-amino-5-methyl-4-chlorobenzene sulfonic acid
2-amino-naphthalene-1-sulfonic acid
2-amino-5-methyl benzene sulfonic acid
2-amino-4,6-dichlorobenzene sulfonic acid
4-amino-3,5-dichlorobenzene sulfonic acid
4-amino-2,3-dichlorobenzene sulfonic acid
2-amino-3,5-dichlorobenzene sulfonic acid
2-amino-3,6-dichlorobenzene sulfonic acid
2-amino-5-chloro-4-ethyl benzene sulfonic acid are diazotized, coupled into 2-hydroxy-3-naphthoic acid, and converted to the manganese salt by the methods described in preceding examples. Valuable pigments, having a variety of desirable hues, depth of masstone, enhanced transparency, and good lightfastness are obtained.

We claim:

1. A compound having the formula:

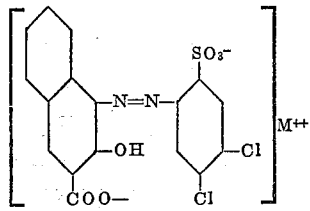

in which M is an alkaline earth metal ion.

2. A compound having the formula:

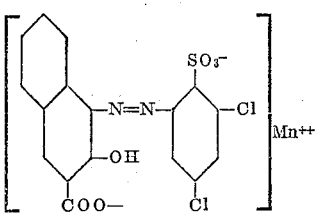

3. A light and heat stable red to maroon pigmentary substance consisting essentially of the water-insoluble metallic salts of the azo dyestuff found upon diazotization of 3,4-dichloroanilinemonosulfonic acid and coupling of said acid with 2-hydroxy-3-naphthoic acid.

4. A light and heat stable red to maroon pigmentary substance consisting essentially of the water-insoluble metallic salts of the azo dyestuff formed upon diazotization of 3,4-dichloroanilinemonosulfonic acid and coupling of said acid with 2-hydroxy-3-naphthoic acid, the metal cation of said salt selected from the group consisting of manganese, calcium, barium, strontium, lead, and zinc.

5. Same as claim 4 where the metal cation is manganese.

6. A light and heat stable red to maroon pigmentary substance consisting essentially of the water insoluble metallic salt of the azo dyestuff formed upon diazotization of 3,4-dichloroaniline-6-sulfonic acid and coupling of said acid with 2-hydroxy-3-napthoic acid, the metal cation being manganese.

7. Pigments comprising essentially of the water insoluble metal salts of the azo dyestuffs formed by coupling diazotized 3,5-dichloraniline-6-sulfonic acid with 2-hydroxy-3-naphthoic acid.

References Cited in the file of this patent

UNITED STATES PATENTS

| | | |
| --- | --- | --- |
| 830,312 | Ernst | Sept. 4, 1906 |
| 2,225,665 | Siegel | Dec. 24, 1940 |
| 2,421,315 | Carson | May 27, 1947 |
| 2,694,055 | Ludwig et al. | Nov. 9, 1954 |